(12) United States Patent
Trotter et al.

(10) Patent No.: US 8,987,940 B2
(45) Date of Patent: Mar. 24, 2015

(54) SYSTEMS AND METHODS FOR PROVIDING A POWER OPTIMIZED WAVEFORM

(75) Inventors: Matthew Shayuan Trotter, Atlanta, GA (US); Gregory David Durgin, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 661 days.

(21) Appl. No.: 13/059,019

(22) PCT Filed: Aug. 17, 2009

(86) PCT No.: PCT/US2009/054063
§ 371 (c)(1),
(2), (4) Date: Feb. 14, 2011

(87) PCT Pub. No.: WO2010/019956
PCT Pub. Date: Feb. 18, 2010

(65) Prior Publication Data
US 2011/0148221 A1    Jun. 23, 2011

Related U.S. Application Data

(60) Provisional application No. 61/089,239, filed on Aug. 15, 2008.

(51) Int. Cl.
*H01F 27/42*   (2006.01)
*H01F 37/00*   (2006.01)
*H01F 38/00*   (2006.01)
*H02J 17/00*   (2006.01)

(52) U.S. Cl.
CPC ................................. *H02J 17/00* (2013.01)
USPC ....................................................... 307/104

(58) Field of Classification Search
CPC ....................................................... H02J 17/00
See application file for complete search history.

(56) References Cited

U.S. PATENT DOCUMENTS

| | | | |
|---|---|---|---|
| 2007/0007342 A1* | 1/2007 | Cleeves et al. | 235/435 |
| 2007/0149162 A1* | 6/2007 | Greene et al. | 455/343.1 |
| 2011/0156493 A1* | 6/2011 | Bennett | 307/104 |
| 2012/0007441 A1* | 1/2012 | John | 307/104 |

\* cited by examiner

*Primary Examiner* — Jared Fureman
*Assistant Examiner* — Aqeel Bukhari
(74) *Attorney, Agent, or Firm* — Troutman Sanders LLP; Ryan A. Schneider; Dustin B. Weeks

(57) ABSTRACT

The present invention describes systems and methods for providing a power optimized waveform. An exemplary embodiment of the present invention provides a method of powering wirelessly powered devices including the step of providing a wirelessly powered device and a wireless power transmission system. Furthermore, the method involves receiving a power waveform to the wirelessly powered device from the wireless power transmission system, wherein each cycle of the power waveform includes a charge portion and a starve portion. Additionally, the maximum voltage of the charge portion is at least double the Root Mean Square ("RMS") voltage of the starve portion.

14 Claims, 19 Drawing Sheets

Step 305

Provide a charge portion of a first cycle of the power optimized waveform from a wireless power transmission system.

Step 310

Provide a starve portion of the first cycle of the power optimized waveform from the wireless power transmission system, wherein the maximum voltage of the charge portion is at least five time the Root Mean Square ("RMS") voltage of the starve portion.

US 8,987,940 B2

SYSTEMS AND METHODS FOR PROVIDING A POWER OPTIMIZED WAVEFORM

BENEFIT AND PRIORITY CLAIMS

This application is a 35 U.S.C. §371 U.S. National Stage of International Application No. PCT/US2009/054063 filed 17 Aug. 2009, which claims priority to and the benefit of U.S. Ser. No. 61/089,239 filed 15 Aug. 2008. All of said prior applications are hereby incorporated by reference in their entireties as if fully set forth below.

CROSS REFERENCE TO RELATED APPLICATION

This application claims the benefit of U.S. Provisional Patent Application No. 61/089,239, filed 15 Aug. 2008, the entire contents and substance of which are hereby incorporated by reference as if fully set forth below.

FIELD OF THE INVENTION

The present invention relates generally to systems and methods for providing power waveforms and, more particularly, to systems and methods for providing power optimized waveforms.

BACKGROUND OF THE INVENTION

Commercial demand for small, portable, and power efficient electronic devices providing a variety of functions and features is growing at an exponential pace. There is an increasing demand to enable systems and methods for wirelessly providing power to electronics. Significantly, it may be possible to power miniature passive electronic devices and potentially even common portable electronic devices, such as cellphones, GPS systems, and media players, via a wireless input signal. The potential applications for wirelessly powered devices is tremendous, yet, the range, reliability, and power efficiency of conventional wirelessly powered systems is limited.

For example, Radio Frequency Identification ("RFID") is increasingly popular in implementations for tracking inventory, retail merchandise, airport baggage, and other items. Passive RFID systems rely upon RFID tags to receive data and power from an input waveform broadcast by an interrogator. Conventional RFID systems provide a limited range in which communication can be established between a RFID interrogator and an RFID tag. In some embodiments, an RFID tag cannot establish communication unless it is within 1 meter of the RFID interrogator. In addition to limited range, conventional RFID tags exhibit rather limited power efficiencies. Therefore, a large percentage of the power emitted from an RFID interrogator cannot be harvested by the integrated circuit of the RFID tag.

Prior art systems and devices have attempted to increase and improve the range and power efficiency of wirelessly powered devices by modifying and tweaking the design of the wirelessly powered device. For example, certain conventional wirelessly powered devices have attempted to limit the number of charge pumps active in a device at any one point. Alternatively, conventional wirelessly powered devices have implemented power management units on the device in an attempt to more efficiently manage the power consumed by the device. Although many prior art attempts have been made to improve the wirelessly powered device, very few have been made to improve the power waveform received by the device.

Therefore, it would be advantageous to provide a wireless power transmission system that would enable an increased range and reliability for wireless devices by improving the power waveform received by the device.

Additionally, it would be advantageous to provide an optimized waveform input for wirelessly powered devices.

BRIEF SUMMARY OF THE INVENTION

The present invention describes systems and methods for providing a power optimized waveform. An exemplary embodiment of the present invention provides a method of powering wirelessly powered devices including the step of providing a wirelessly powered device and a wireless power transmission system. Furthermore, the method involves receiving a power waveform to the wirelessly powered device from the wireless power transmission system, wherein each cycle of the power waveform includes a charge portion and a starve portion. Additionally, the maximum voltage of the charge portion is at least double the Root Mean Square ("RMS") voltage of the starve portion.

These and other objects, features and advantages of the present invention will become more apparent upon reading the following specification in conjunction with the accompanying drawing figures.

BRIEF DESCRIPTION OF THE FIGURES

FIG. 3 provides a block diagram illustration of a method of providing a power optimized waveform 300 in accordance with an exemplary embodiment of the present invention.

DETAILED DESCRIPTION

Figure 1:
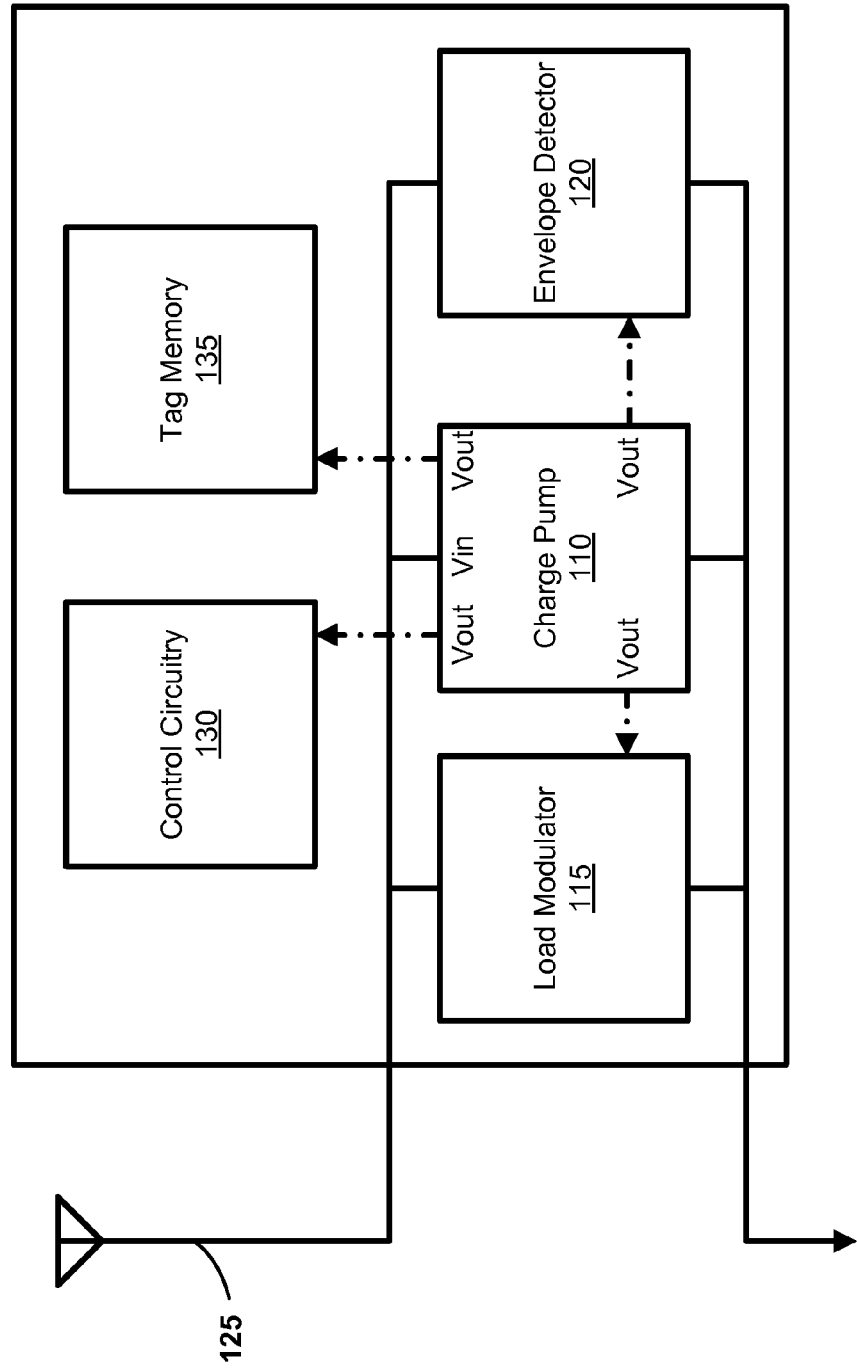
FIG. 1 provides a block diagram illustration of a wirelessly powered device 105 in accordance with an exemplary embodiment of the present invention.

The present invention addresses the deficiencies in the prior art concerning the inability to provide efficient and effective power inputs to wirelessly powered devices. The present invention provides methods and apparatus for providing a power optimized waveform to a wirelessly powered device. A power optimized waveform provided in accordance with the present invention is enabled to more efficiently deliver power to a wirelessly powered device to enable the wireless devices to have greater range or improved power performance. Additionally, the present invention overcomes the drawbacks of the conventional methods and systems in the prior art and provides systems and methods which can increase the power efficiency of wireless devices and wireless power transmitters.

An exemplary embodiment of the present invention provides a method of powering wirelessly powered devices including the step of providing a wirelessly powered device and a wireless power transmission system. Furthermore, the method involves receiving a power waveform to the wirelessly powered device from the wireless power transmission system, wherein each cycle of the power waveform includes a charge portion and a starve portion. Additionally, the maximum voltage of the charge portion is at least double the Root Mean Square ("RMS") voltage of the starve portion.

The power optimized waveforms enabled by the present invention present significant advantages to the area of wirelessly powered devices. Conventional powering methods lead to an inefficient use of the power contained in the input waveform received by the wirelessly powered devices. Therefore, the range, sensitivity, reliability, and power efficiency of conventional wirelessly powered devices is greatly hindered. For example, a significant portion of energy supplied by a conventional Continuous Wave ("CW") input to a wirelessly powered device is dissipated by the diodes of the charge pump of the wirelessly powered device.

In contrast, a power optimized waveform ("POW") generated by an exemplary embodiment of the method of providing a power optimized waveform of the present invention provides more efficient power delivery by minimizing the energy loss due to the threshold voltages of the diodes of a charge pump of a wirelessly powered device. The power efficiency of a charge pump of a wirelessly powered device is limited by voltage necessary to "turn-on" or bias one or more of the diodes of the charge pump. For example, in conventional systems using a CW waveform, the power output by a charge pump from each pulse of a conventional continuous wave input is reduced by the threshold voltage of the diode turned on by a particular pulse. Significantly, the exemplary embodiments of the present invention overcome the limitations of energy loss due to threshold voltage of the diode by delivering the majority of the energy of the waveform in a small number of pulses, rather than an equal amount in each pulse, as with a CW input. By delivering the majority of the voltage in one pulse or a small number of pulses, the negative effect of the dissipation of energy by the threshold voltage of the diodes of the charge pump can be minimized.

The term wirelessly powered device is used herein to refer any device capable of receiving power as input. A wirelessly powered device can also be configured to receive power through a wired input in addition to its wireless capability. Examples of wirelessly powered devices can include RFID devices, remote transmitters, sensor based devices, cell phones, digital media players such as MP3 players, GPS devices, and other electronics.

FIG. 1 provides a block diagram illustration of a wirelessly powered device 105 in accordance with an exemplary embodiment of the present invention. The wirelessly powered device 105 shown in the exemplary embodiment of FIG. 1 is an RFID tag. Those of skill in the art will appreciate that while the discussion herein is directed toward RFID applications, the exemplary embodiments of the present invention can involve any type of wirelessly powered device. The wirelessly powered device 105 can provide a charge pump 110. In an exemplary embodiment of the wirelessly powered device 105 shown in FIG. 1, the charge pump 110 can be connected in parallel to a load modulator 115 and an envelope detector 120. As shown in FIG. 1, the wirelessly powered device 105 can provide an antenna 125 for transmission and reception of a wireless signal. Additionally, the wirelessly powered device 105 can provide control circuitry 130 such as an integrated circuit to operate the device 105.

In an exemplary embodiment of the wirelessly powered device 105, RF power can be received by the antenna 125, propagate down the transmission line, and be dissipated across the parallel combination of the switched load and the input impedance of the charge pump 110. The charge pump 110 in an exemplary embodiment can rectify and convert the input RF power into DC power for the load modulator 115, envelope detector 120, control circuitry 130, and tag memory 135. In an exemplary embodiment of the wirelessly powered device 105, the load modulator 115 can flip the switched load located inside the load modulator 115 on and off according to the binary information stored in the tag memory 135. In some embodiments, the load modulator 115 can be configured to switch between matched loads as well.

In conventional systems, the switching of the load modulator 115 can create an input problem for the charge pump 110. For example, in conventional systems the charge pump 110 is starved of RF power whenever the switch is closed because some or all of the RF power will dissipate or reflect at the switched load. Thus, the charge pump 110 in a conventional system will not have enough input voltage to power the other functional blocks in the wirelessly powered device 105. Conventional systems address this problem by configuring the output of the charge pump 110 to hold its DC voltage for a relatively long period of time so that the other functional blocks can remain powered during data transmission by the wirelessly powered device 105. In order to maintain a DC voltage output for a relatively long period of time, these conventional systems require the wirelessly powered device 105 to include capacitors with a relatively large capacity in the charge pump 110 that can hold a steady voltage for the duration of the power starvation period of the charge pump 110.

Figure 2:
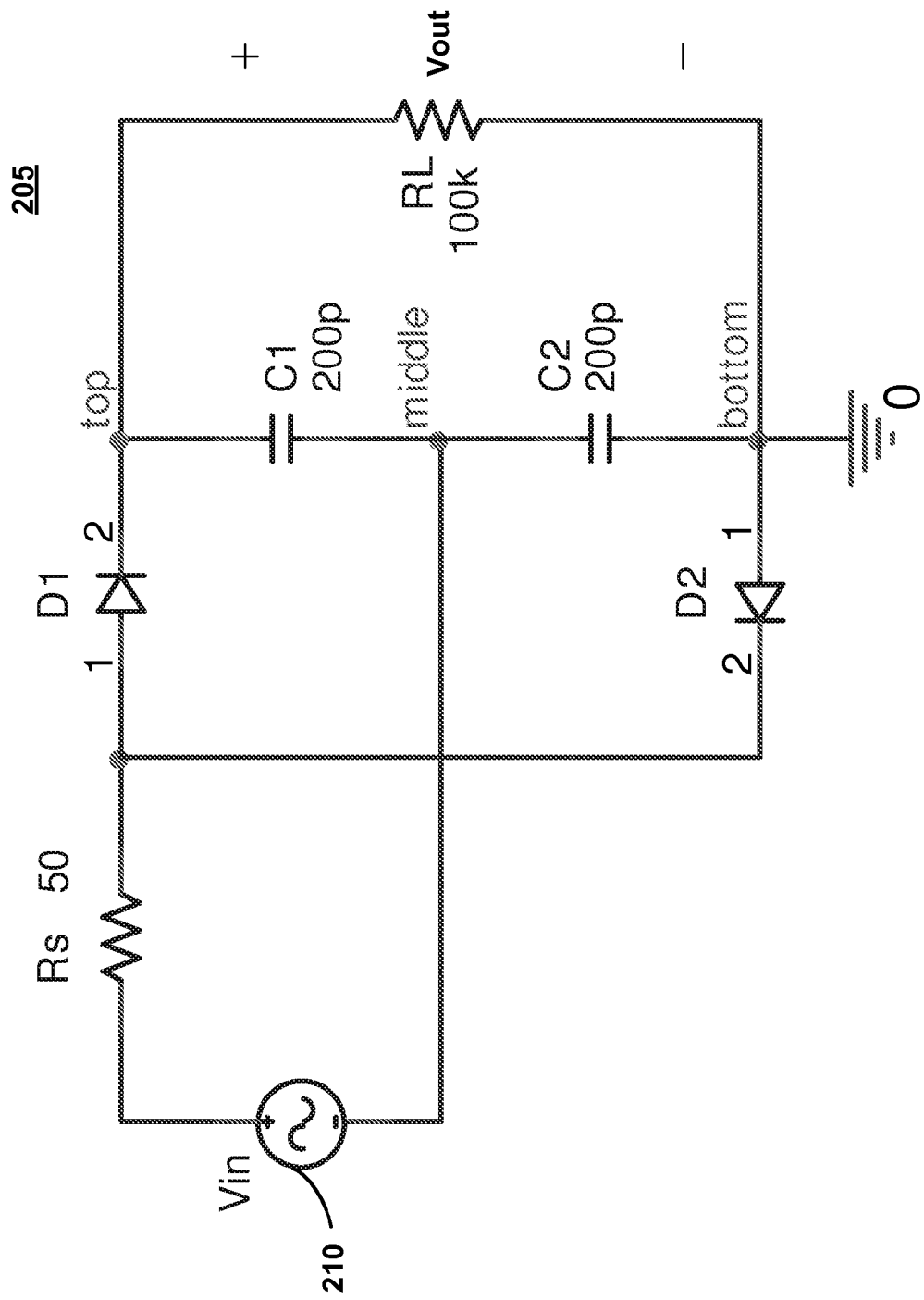
FIG. 2 provides a circuit diagram of a voltage doubler 205 in accordance with an exemplary embodiment of the present invention.

FIG. 2 provides a circuit diagram of a voltage doubler 205 in accordance with an exemplary embodiment of the present invention. In an exemplary embodiment of the wirelessly powered device 105, the charge pump 110 can include a voltage doubler 205. Although the voltage doubler 205 provides the benefits of design simplicity, relatively low cost of fabrication, and voltage gain, the voltage doubler exhibits a relatively small power efficiency. Specifically, the efficiency of the voltage doubler 205 shown in FIG. 2 is inversely proportional to the number of diode stages. The trade-off for using higher-order charge pumps is sacrificing power efficiency for voltage gain. A high-order charge pump has many more diodes and parasitic resistances than the voltage doubler 205 shown in FIG. 2. These extra diodes dissipate extra power. The voltage output equation for the exemplary embodiment of the voltage doubler 205 shown in FIG. 2 is $V_{out}=2(V_{in,max}-V_t)$.

In an exemplary embodiment, the voltage doubler 205 is configured such that the diode $D_1$ turns on and diode $D_2$ turns off when $V_{in}$ reaches a positive voltage during its oscillations. Additionally, the top pin on capacitor $C_1$ of the exemplary embodiment of the voltage doubler 205 can charge to $V_{in}-V_t$ relative to the middle pin of the capacitor $C_1$, which is the negative terminal of the RF source 210. In the exemplary embodiment shown in FIG. 2, when $V_{in}$ reaches its maximum voltage, $C_1$ charges to $V_{in,max}-V_t$, and $C_1$ can hold this voltage for a period of time even when $V_{in}$ swings to smaller voltages. Furthermore, when $V_{in}$ swings low and $D_1$ turns off, $C_1$ can discharge into the load resistor, $R_L$. In an exemplary embodiment of the voltage doubler 205, the capacitor $C_1$ is configured with sufficient capacity to maintain a voltage for a relatively long period of time. In an exemplary embodiment of the voltage doubler 205, when $V_{in}$ oscillates into negative voltage, diode $D_2$ can turn on and the bottom pin on $C_2$ can charge to $-(|V_{in}|-V_t)$ relative to the middle pin. Additionally, in an exemplary embodiment of the voltage doubler 205, when $V_{in}$ reaches its minimum voltage, $C_2$ can charge to $-(|V_{in,min}|-V_t)$ and then hold that voltage for a period of time even when $V_{in}$ swings to smaller voltages. After $C_1$ and $C_2$ have charged to their maximum voltages in an exemplary embodiment of the voltage doubler 205, the voltage across the load resistor is the voltage difference between the top and bottom pins, which can be equal to $(V_{in,max}-V_t)+(|V_{in,min}|-V_t)$. Since $V_{in,max}=|V_{in,min}|$, the output can be defined as $V_{out}=2(V_{in,max}-V_t)$. As the formula illustrates, the voltage generated by the voltage doubler 205 is limited by the threshold voltages of the diodes $D_1$ and $D_2$.

In an exemplary embodiment, the power efficiency of the voltage doubler 205 shown in FIG. 2 is limited by the threshold voltages of the diodes $D_1$ and $D_2$. Larger threshold voltages for the diodes $D_1$ and $D_2$ results in smaller power efficiency of the exemplary embodiment of the voltage doubler 205. Those of skill in the art will appreciate that the threshold voltages of the diodes $D_1$ and $D_2$ prohibit the capacitors from charging to the peak voltage of the input. Thus, higher peak voltages at the input result in greater charge in the capacitors C1 and C2 shown in the exemplary embodiment of the voltage doubler 205 in FIG. 2, which further results in a larger voltage output of the voltage doubler 205.

For example, and not limitation, with $V_{in,max}=1V$, the capacitors charge to $Q=C(1-V_t)$ where Q is the charge on the capacitor. With $V_{in,max}=2V$, the capacitors charge to $Q=C(2-V_t)$. In each case, the capacitor's peak charge is limited by $Q_{lost}=CV_t$. The ratio of the charge lost to the charge gained, however, is smaller for the $V_{in,max}=2V$ case. In the case in which $V_{in,max}=2V$, the output voltage is larger too, which means more power is delivered to the load resistor. Therefore, in accordance with an exemplary embodiment of the present invention, a wireless power transmission system can be configured to provide relatively large maximum input voltages, $V_{in,max}$, to a voltage doubler 205 of a wirelessly powered device 105, thereby increasing the power efficiency of the wirelessly powered device 105.

It is highly desired for wirelessly powered devices to provide an increased range, improved reliability, and reduced cost, while limiting radiation power. For many embodiments, the maximum operating range and reliability of the wirelessly powered device is determined by the sensitivity of the wirelessly powered device to stimulus from a wireless power transmission system. Those of skill in the art will appreciate that the term wireless power transmission system is used herein to refer to any device capable of emitting a power signal, such as an RF signal, including interrogators, readers, and other devices. Additionally, the term wireless power transmission system is used herein to refer to a system that can output one or more analog signals providing both power and data simultaneously, such as a reader signal sent by an interrogator to an RFID tag. In an exemplary embodiment of the wireless power transmission system, the radiation power emitted by the wireless power transmission system is directly proportional to the Root Mean Square ("RMS") voltage of the power input waveform. As disclosed, an increase in the maximum input voltage, $V_{in,max}$, supplied to the wirelessly powered device 105 will increase the sensitivity of the wirelessly powered device 105. Furthermore, keeping the RMS voltage of the power waveform supplied to the wirelessly powered device 105 from an exemplary embodiment of the wireless power transmission system low or small will limit the radiation power. In an exemplary embodiment, the wireless power transmission system can output a waveform with a relatively large maximum input voltage, $V_{in,max}$, and a relatively small RMS voltage.

FIG. 3 provides a block diagram illustration of a method of providing a power optimized waveform 300 in accordance with an exemplary embodiment of the present invention. As shown in FIG. 3, the first step 305 in the exemplary embodiment of the method of providing a power optimized waveform 300 involves providing a charge portion of a first cycle of the power optimized waveform from a wireless power transmission system. As shown in FIG. 3, the second step 310 in the exemplary embodiment of the method of providing a power optimized waveform 300 involves providing a starve portion of the first cycle of the power optimized waveform from the wireless power transmission system, wherein the maximum voltage of the charge portion is at least double the RMS voltage of the starve portion.

In some embodiments, the maximum voltage of the charge portion can be much greater than double the RMS voltage of the starve portion. For example, and not limitation, in one embodiment the maximum voltage of the charge portion of the power optimized waveform can be five times greater than the RMS voltage of the starve portion. Those of skill in the art will appreciate that the differential between the charge portion and the starve portion can be equivalently described in current rather than voltage. In an alternative embodiment, the second step 310 in the exemplary embodiment of the method of providing a power optimized waveform 300 involves providing a starve portion of the first cycle of the power optimized waveform from the wireless power transmission system, wherein the maximum current of the charge portion is at least double the RMS current of the starve portion.

In an alternative embodiment, the duration of the charge portion is less than 20% of a duration of the starve portion for the first cycle. In some embodiments, the duration of the charge portion is less than 35% of a duration of the starve portion for the first cycle.

The greater duration of the starve portion of the power optimized waveform in comparison to duration of the charge portion results in a reduction in the overall RMS voltage of the power optimized waveform. For certain implementations, the wireless power transmission system must satisfy radiated power specifications. Thus, it is not possible to overcompensate and make every pulse of the outputted waveform have a relatively large voltage to increase the range or received voltage of the wirelessly powered devices. In these restricted implementations, the overall RMS voltage of the outputted waveform must be kept below a threshold voltage. For example, and not limitation, the FCC requires that interrogators used as wireless power transmission systems for RFID wirelessly powered devices must meet certain transmission limitations. Therefore, the RMS voltage of the interrogators practicing within these FCC guidelines must meet these requirements. In accordance with the exemplary embodiments of the present invention, the method of providing a power optimized waveform 300 enables for more efficient delivery of power to wirelessly powered devices, while at the same time maintaining a relatively low overall RMS voltage for the waveform.

Figure 4:
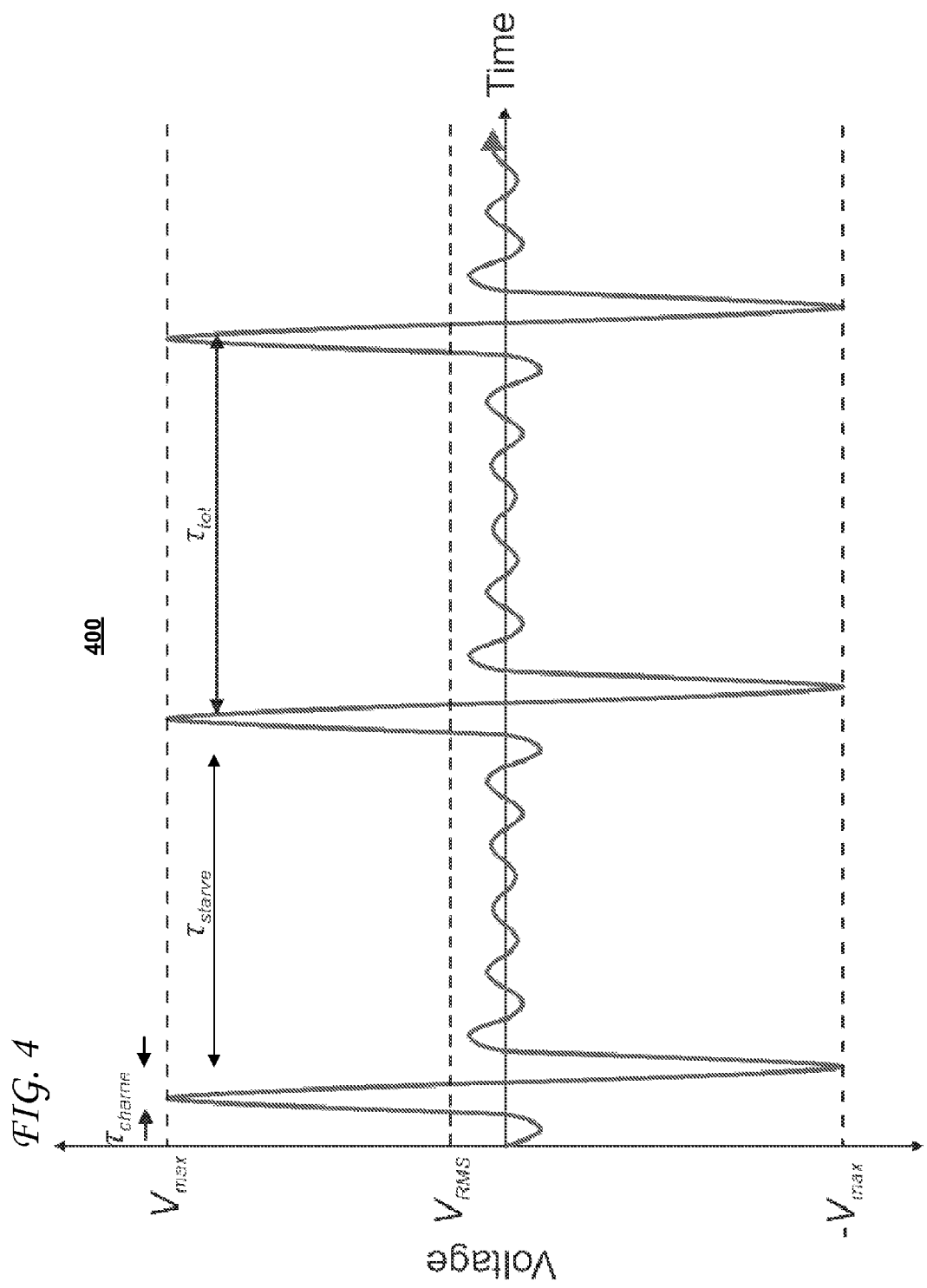
FIG. 4 provides an illustration of an exemplary embodiment of a power optimized waveform 400 in accordance with an exemplary embodiment of the present invention.

FIG. 4 provides an illustration of an exemplary embodiment of a power optimized waveform 400 in accordance with an exemplary embodiment of the present invention. As shown in FIG. 4, an exemplary embodiment of the power optimized waveform 400 has a charge portion that ends with a relatively large amplitude pulse, $V_{max}$, for a relatively short duration, $\tau_{charge}$. In alternative embodiments, the charge portion, $\tau_{charge}$, can provide multiple monotonically increasing pulses. A starve portion or starve portion of the exemplary embodiment of the power optimized waveform 400 provides a series of small amplitude pulses which monotonically decrease for the majority of a cycle of the waveform 400, $\tau_{starve}$. As shown in the exemplary embodiment in FIG. 4, the starve portion of the power optimized waveform 400 begins when the waveform 400 moves away from its most recent maximum or minimum reached during the charge portion of the power optimized waveform 400. Likewise the starve portion of the power optimized waveform 400 ends when the magnitude of the waveform 400 grows large enough to increase the magnitude of the output waveforms. The total period of the exemplary embodiment of the power optimized waveform 400 shown in FIG. 4, $\tau_{tot}$, is equal to the sum of $\tau_{charge}$ and $\tau_{starve}$.

In an exemplary embodiment, the power optimized waveform 400 can be constructed by creating a periodic function with multiple frequency components. For example and not limitation, the power optimized waveform 400 could be made up of a periodic signal with 5 separate frequency components, such that each frequency component is equally spaced in the frequency domain, and each component has the same amplitude. In an exemplary embodiment, the time-domain voltage input equation is:

$$V_{in}(t) = A\sin(2\pi f_1 t) + A\sin(2\pi f_2 t) + A\sin(2\pi f_3 t) + A\sin(2\pi f_4 t) + A\sin(2\pi f_5 t)$$

Figure 5:
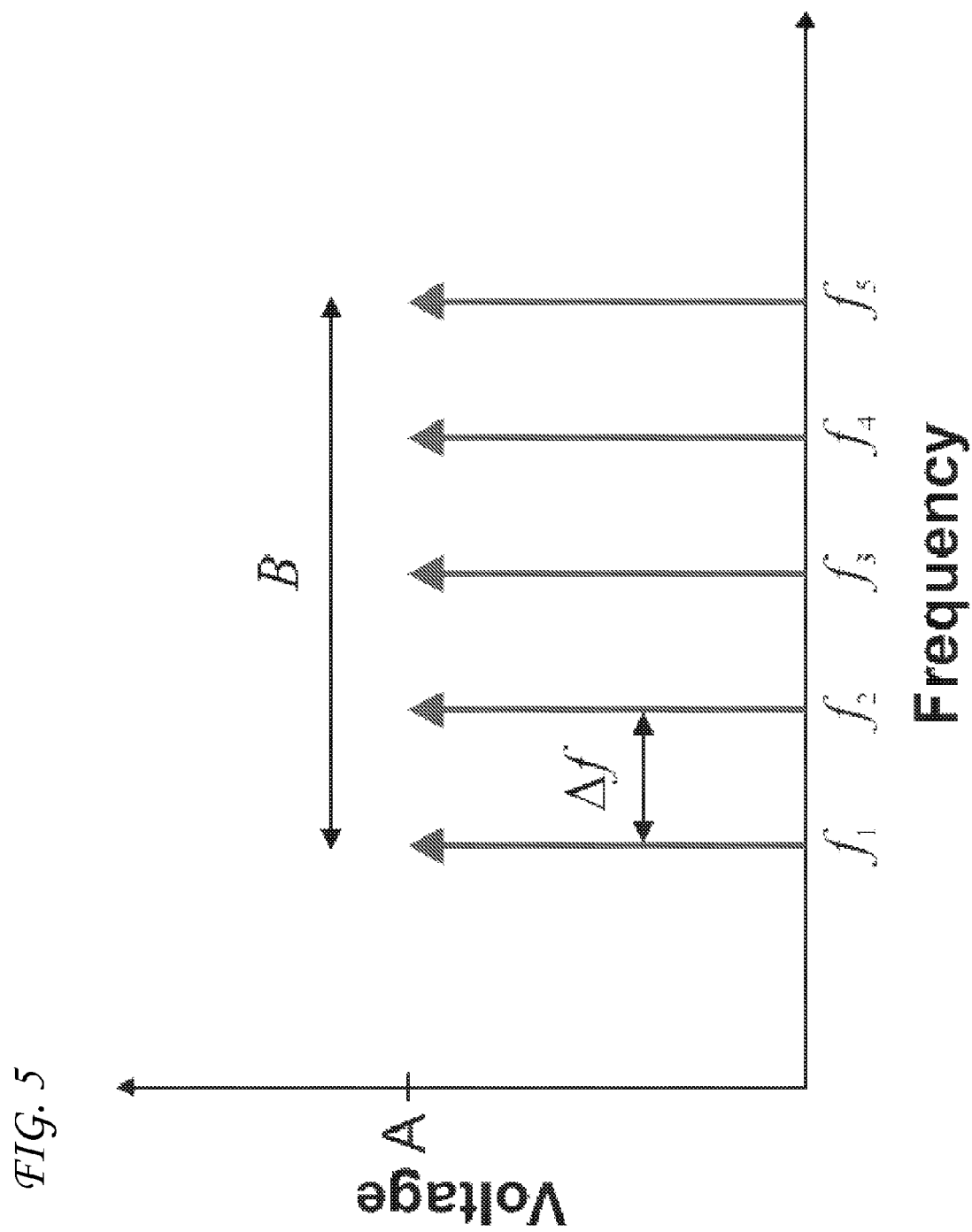
FIG. 5 provides an illustration of the frequency spectrum of the power optimized waveform 400 provided in accordance with an exemplary embodiment of the present invention.

FIG. 5 provides an illustration of the frequency spectrum of the power optimized waveform 400 provided in accordance with an exemplary embodiment of the present invention. As shown in FIG. 5, the frequency spectrum illustrates that this exemplary embodiment of the power optimized waveform 400 is comprised of 5 sources with equal amplitude.

Figure 6:
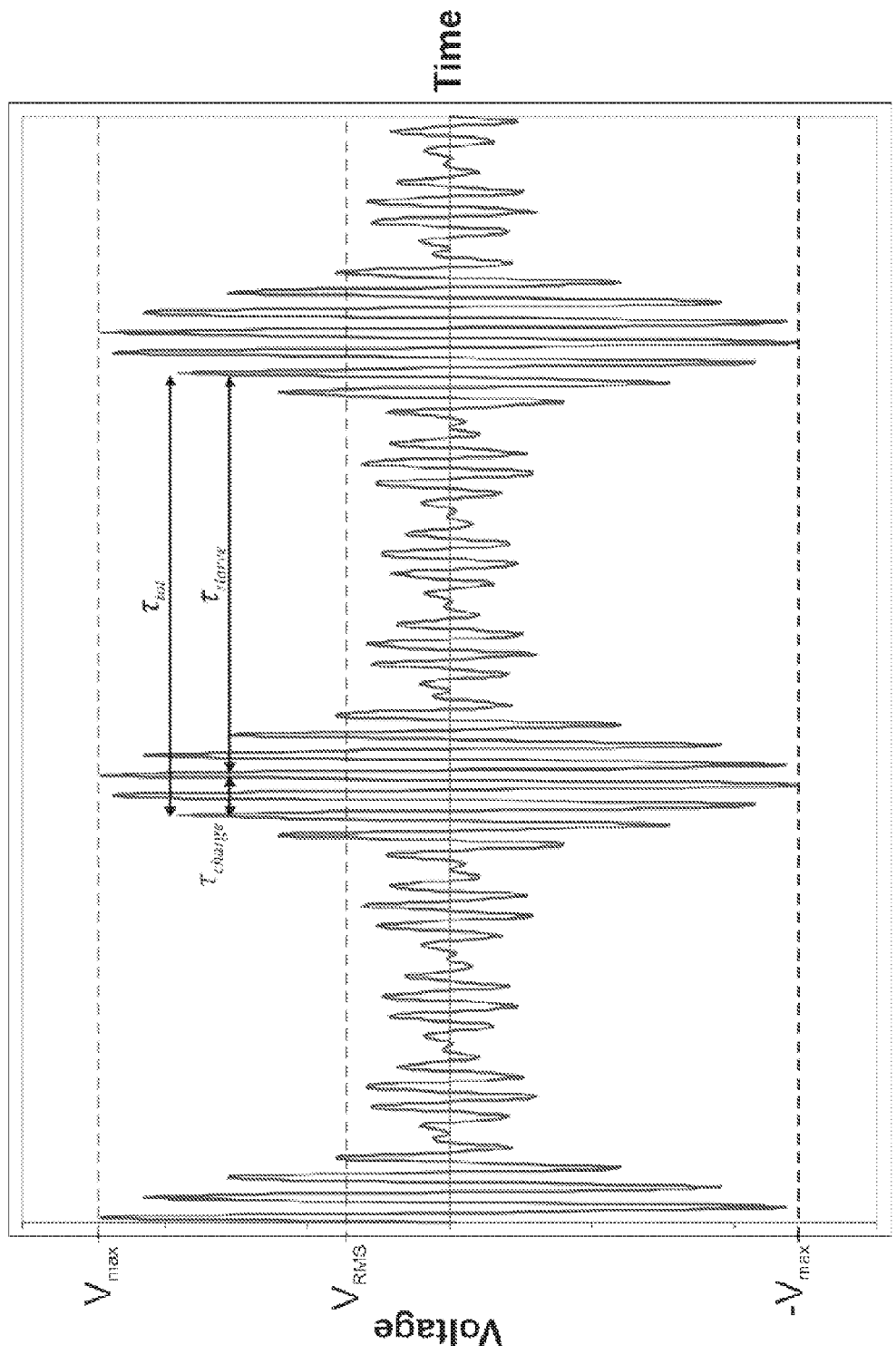
FIG. 6 provides an illustration of the time-domain of the power optimized waveform 400 provided in accordance with an exemplary embodiment of the present invention.

FIG. 6 provides an illustration of the time-domain of the power optimized waveform 400 provided in accordance with an exemplary embodiment of the present invention. In the exemplary embodiment of the power optimized waveform 400 shown in FIG. 6, the maximum voltage, $V_{max}$, is equal to 5 A, where A is the amplitude of each sub carrier, and can be defined by the following $$\tau_{tot} = \frac{1}{\Delta f}, \quad B = 5\Delta f, \text{ and}$$

$$V_{RMS} \approx \sqrt{5\left(\frac{A}{\sqrt{2}}\right)^2}, \quad f \gg \Delta f$$

In an exemplary embodiment, a wirelessly powered device 105 receiving the power optimized waveform 400, shown in FIG. 6, with A=0.4471 and $V_t$=0.7V, the output would be $V_{out}$=2(5A−0.7)=3.071V and its RMS voltage would be 0.7071 V.

In an alternative embodiment, the power optimized waveform 400 can include one frequency component in the form $V_{in}(t) = 1 \sin(2\pi f_3 t)$ and the same RMS voltage. For this alternative embodiment, the output would be $V_{out}$=2(1−0.7) =0.6V.

Figure 7A:
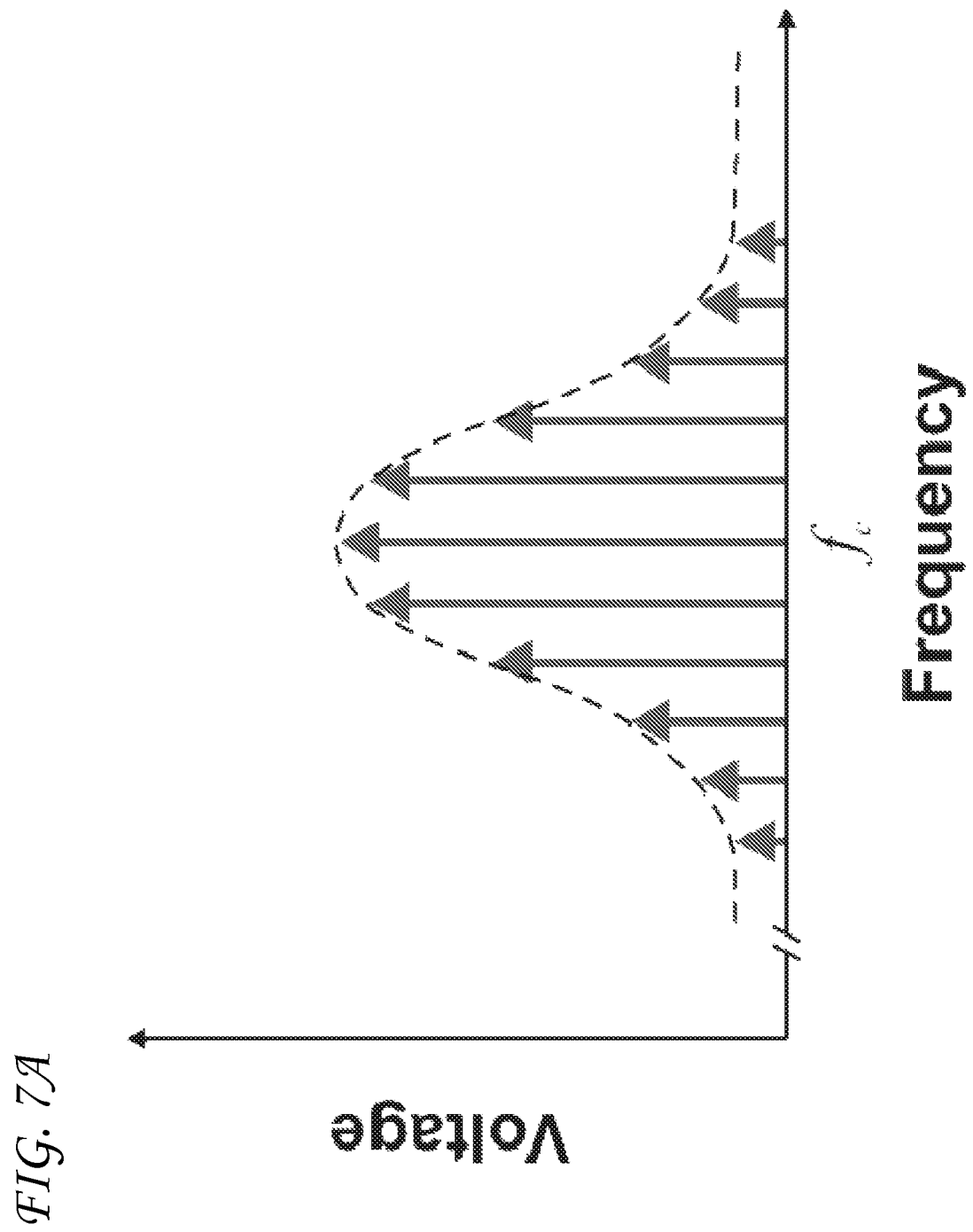
FIGS. 7A and 7B provide illustrations of the power optimized waveform 400 in accordance with an exemplary embodiment of the present invention.
Figure 7B:
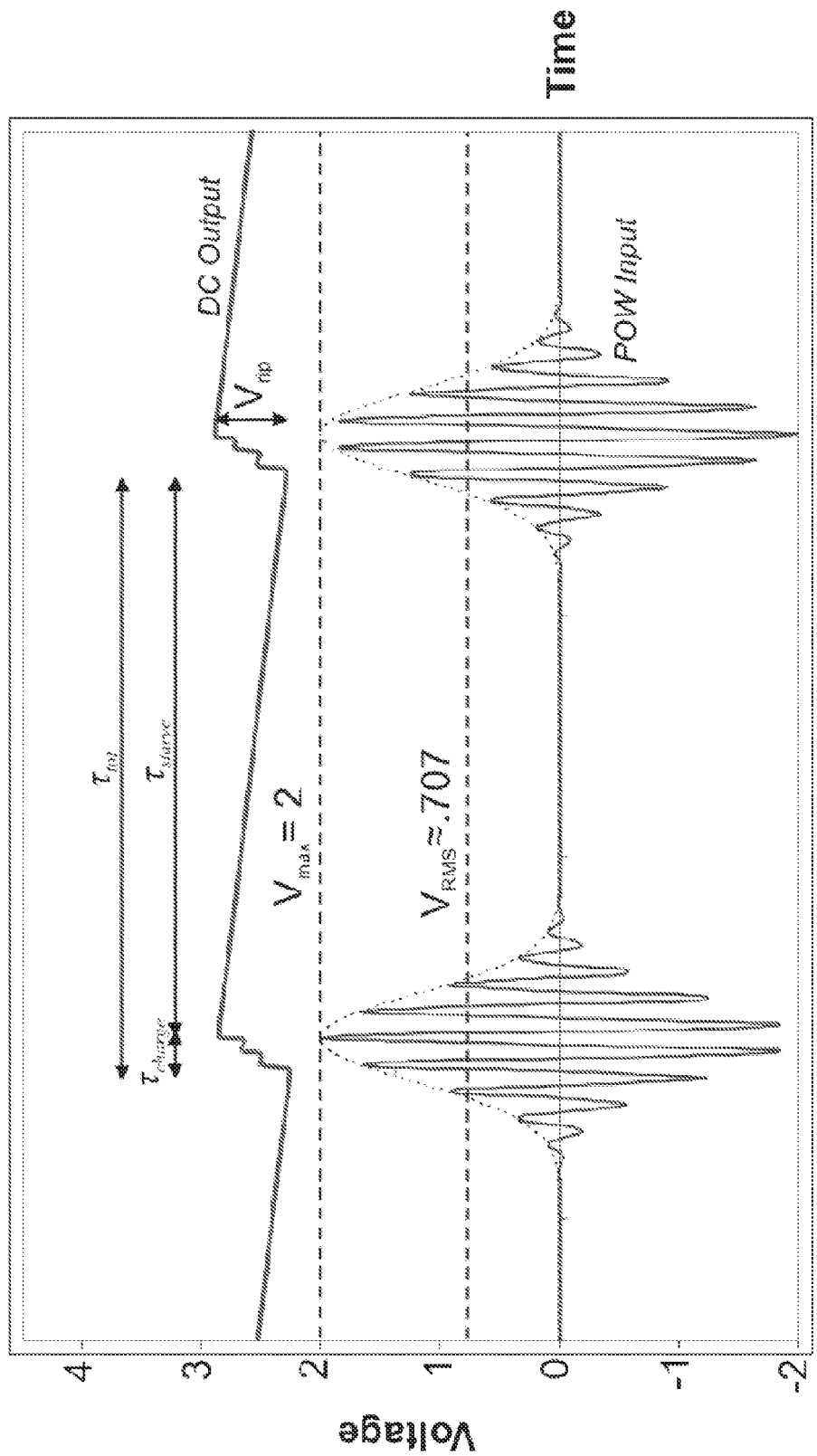

FIGS. 7A and 7B provide illustrations of the power optimized waveform 400 in accordance with an exemplary embodiment of the present invention. FIG. 7A illustrates the frequency spectrum of an exemplary embodiment of the power optimized waveform 400. As shown in FIG. 7A, the exemplary embodiment of the power optimized waveform 400 can provide a Gaussian packet periodic waveform. Specifically, the frequency spectrum for the power optimized waveform 400 embodiment in FIG. 7A is shaped like a Gaussian bell curve and can be approximated with multiple sub-carriers filling in the bell curve shape. FIG. 7B provides an illustration of the time-domain of the Gaussian packet periodic power optimized waveform 400 provided in accordance with an exemplary embodiment of the present invention.

Figure 8A:
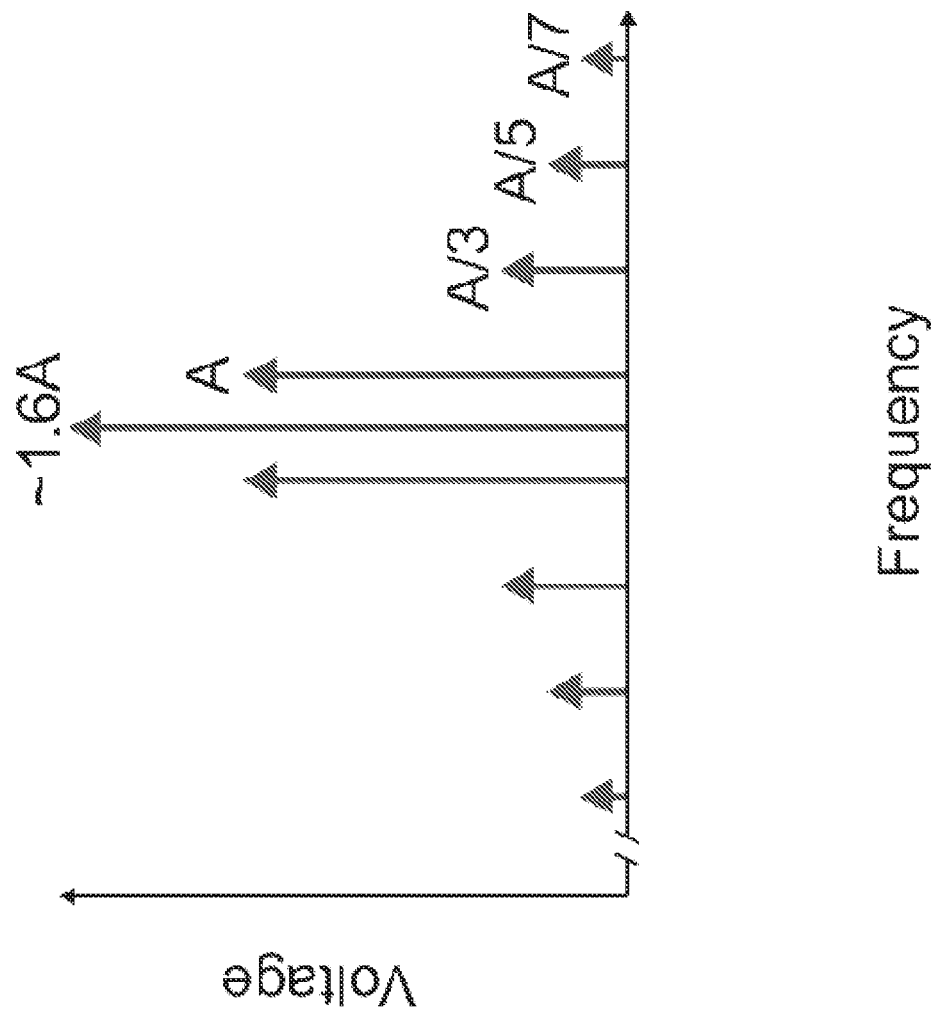
FIGS. 8A and 8B provide illustrations of the power optimized waveform 400 in accordance with an exemplary embodiment of the present invention.
Figure 8B:
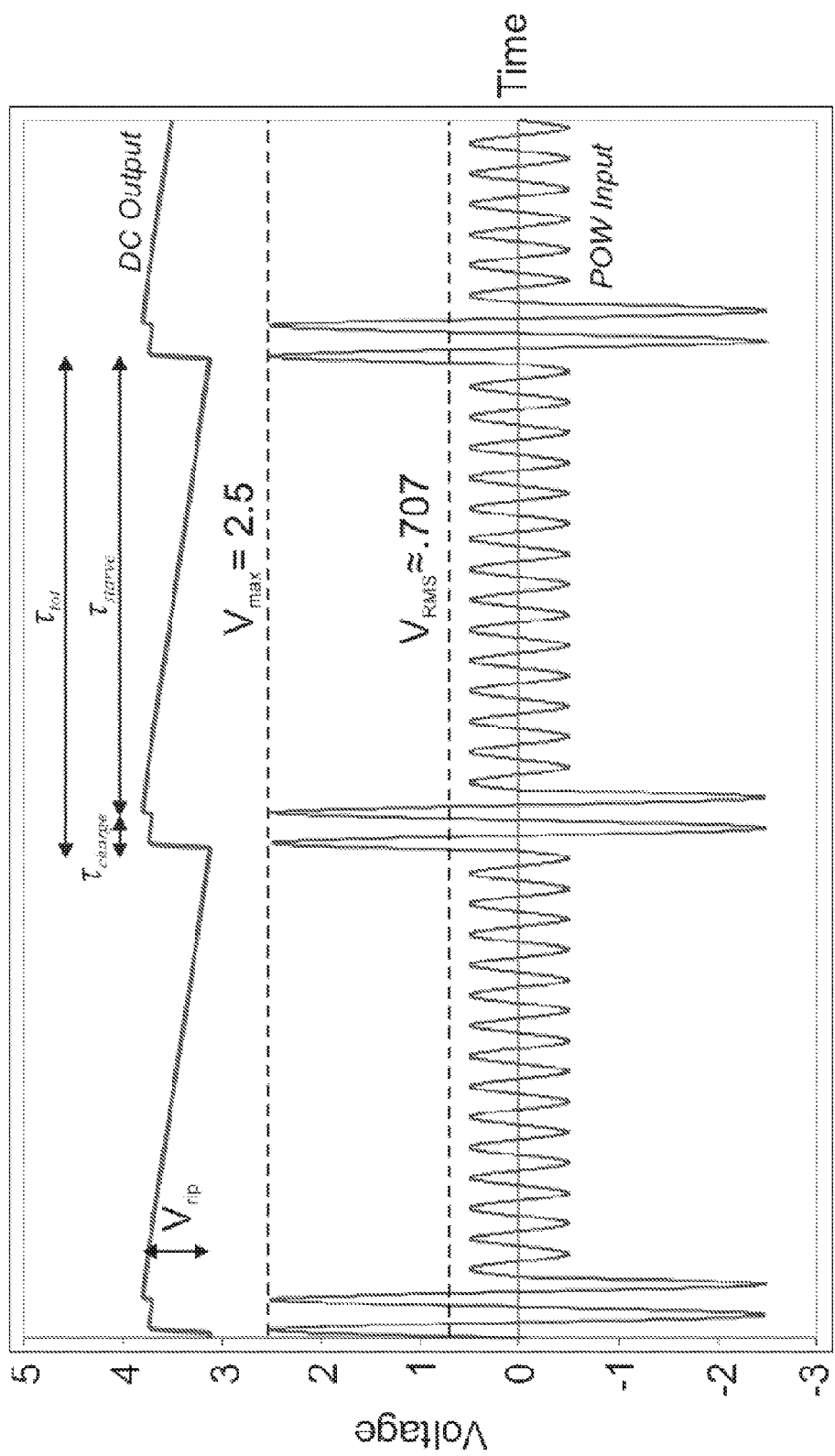
Figure 9A:
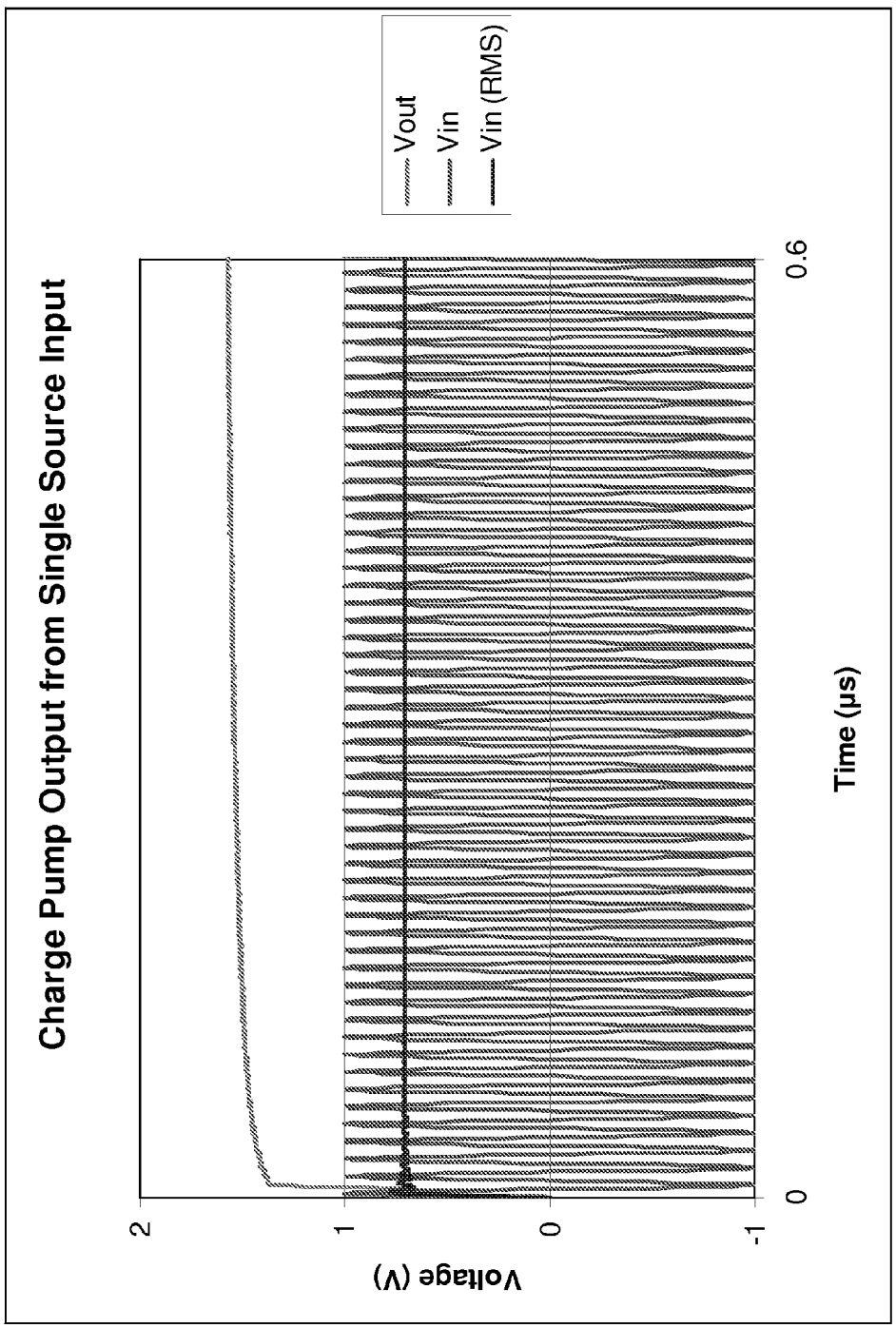
FIGS. 9A-9E provide illustrations of the output of the charge pump 110 of various embodiments of the wirelessly powered device 105 in accordance with exemplary embodiments of the present invention.
Figure 9B:
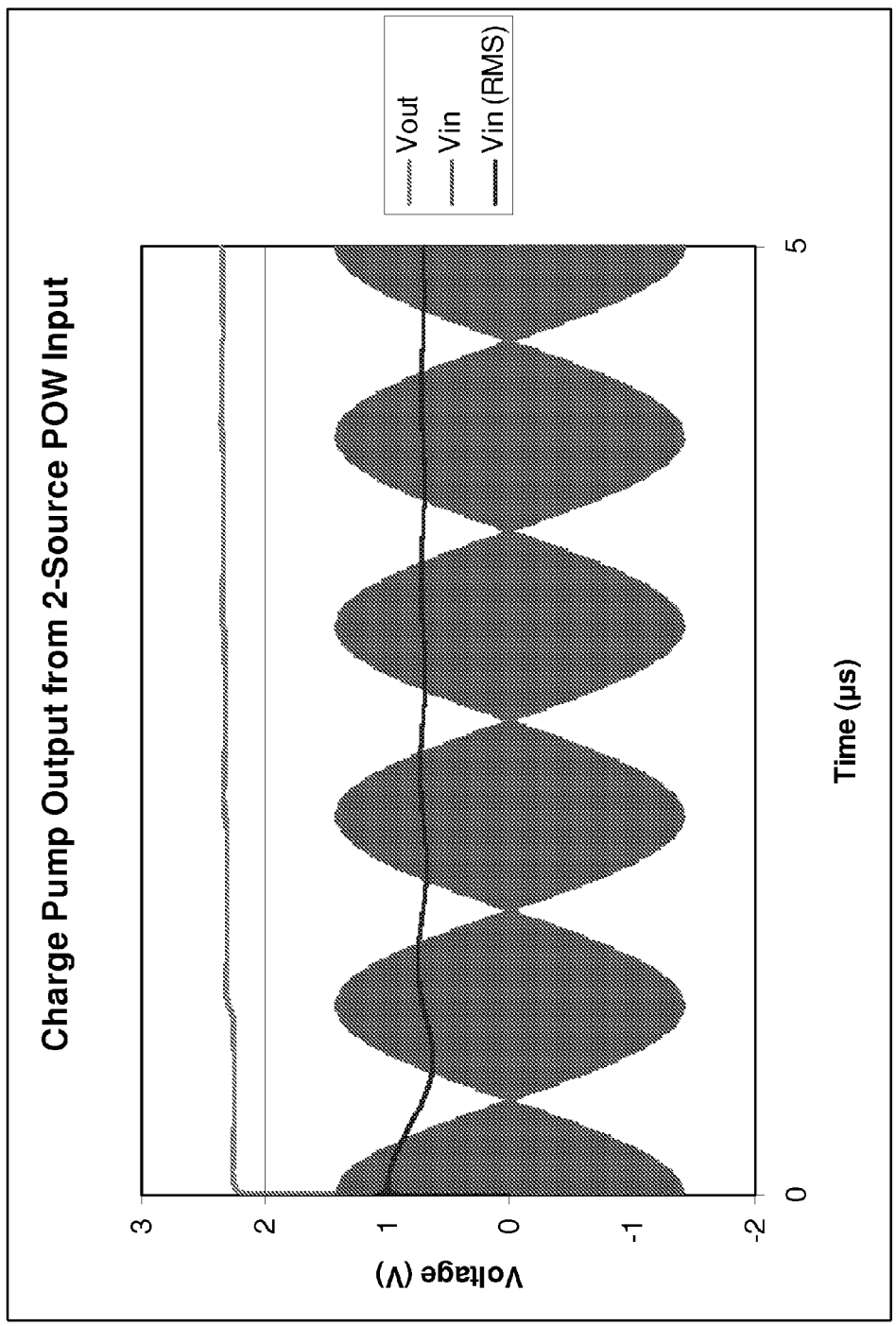
Figure 9C:
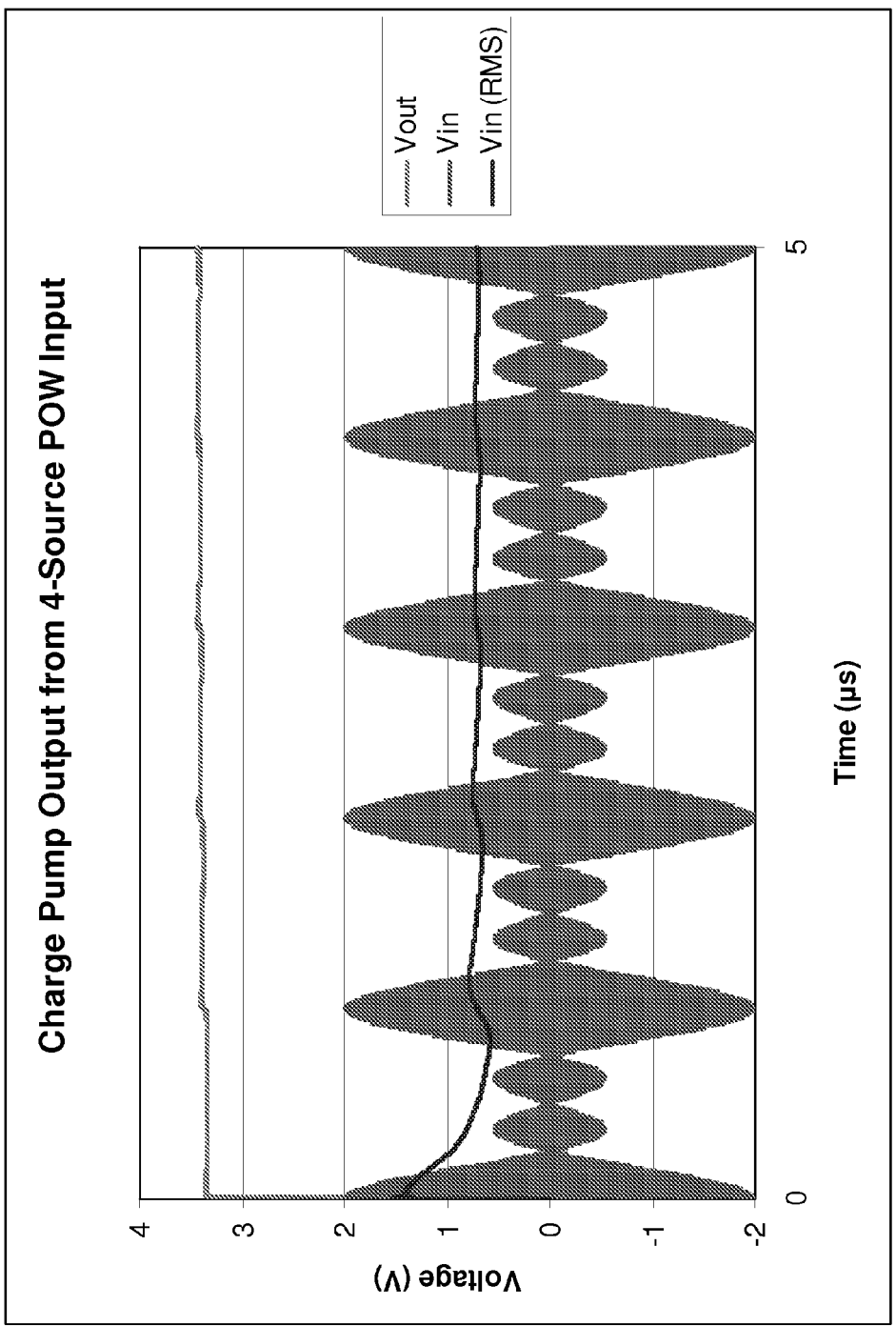
Figure 9D:
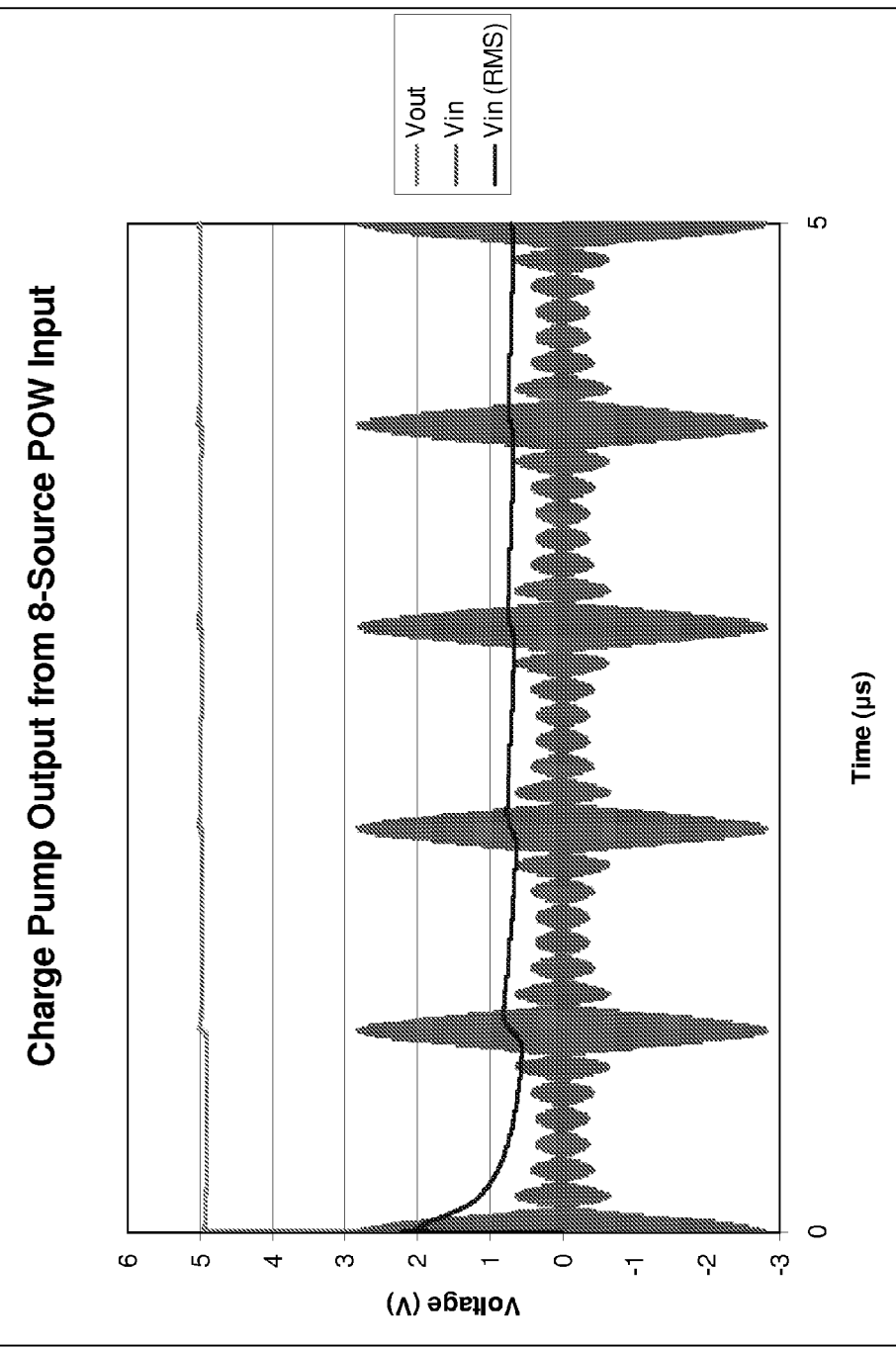
Figure 9E:
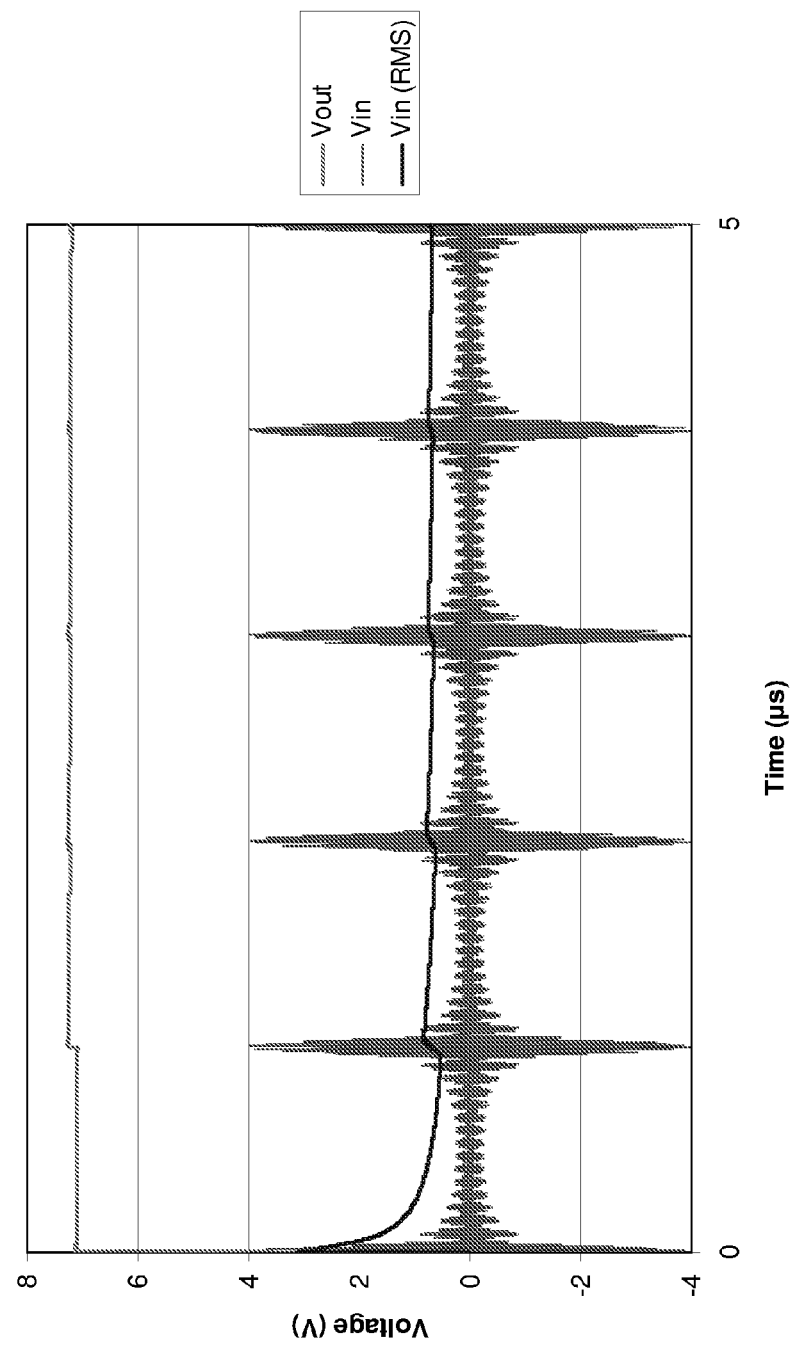

FIGS. 8A and 8B provide illustrations of the power optimized waveform 400 in accordance with an exemplary embodiment of the present invention. FIG. 8A illustrates the frequency spectrum of an exemplary embodiment of the power optimized waveform 400. As shown, the exemplary embodiment of the power optimized waveform 400 in FIG. 8A provides a a square wave packet waveform. Particularly, the frequency spectrum of the exemplary embodiment of the power optimized waveform 400 shown in FIG. 8A represents a duty cycle square wave frequency mixed with a carrier at $f_c$. FIG. 8B provides an illustration of the time-domain of the square wave packet power optimized waveform 400 provided in accordance with an exemplary embodiment of the present invention. The waveform 400 in FIG. 8B is a 12.5% duty cycle square wave frequency mixed with a carrier at $f_c$.

FIGS. 9A-9E provides illustrations of the output of the charge pump 110 of various embodiments of the wirelessly powered device 105 in accordance with exemplary embodiments of the present invention. The graphs provided 9A-9E plot $V_{out}$, $V_{in}$, and $V_{in}$(RMS) versus time for each implementation using 1, 2, 4, 8, and 16 sources of a power optimized waveform 400 input ("POW Input"). In these embodiments, $V_{in}$(RMS) is measured within the simulator as the instantaneous RMS value of the $V_{in}$ waveform. The graphs provided 9A-9E illustrate that charge pump 110 of the various embodiments of the wirelessly powered device 105 functions as expected when receiving the power optimized waveform 400 from one or many sources. In the embodiments graphed in FIGS. 9A-9E, the sources are centered on 9 MHz. As illustrated in FIGS. 9A-9E, the total RMS voltage of each input waveform is the same in all cases: 0.707 V. The figures confirm empirically the output equation for an exemplary embodiment of the wirelessly powered device 105 is $V_{out}$=2 ($V_{max}$−$V_t$). Additionally, the FIGS. 9A-9E illustrate that the power optimized waveform 400 provides extra output power for the same input power.

Figure 10:
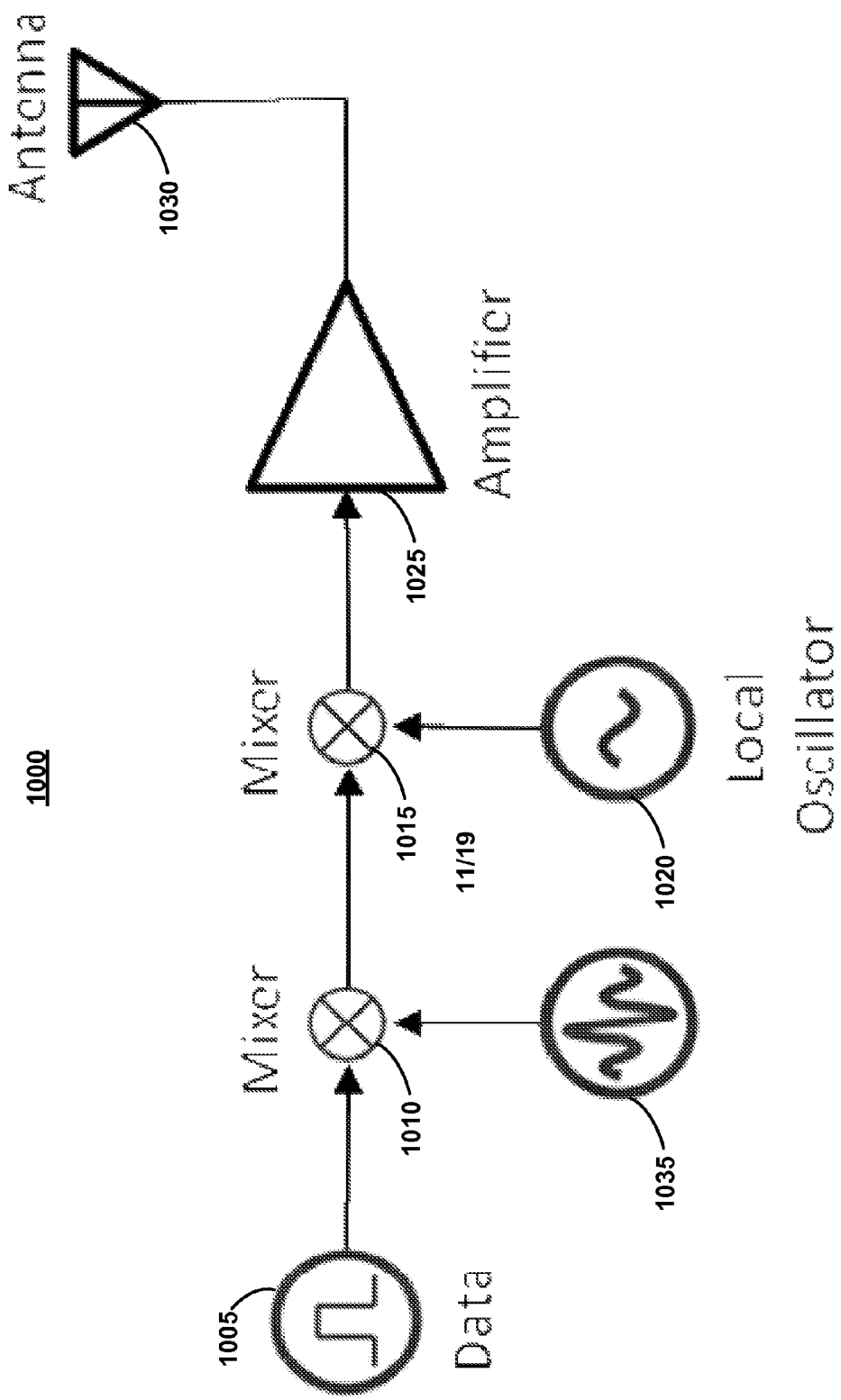
FIG. 10 provides a block diagram of the architecture of a wireless power transmission system 1000 including one amplifier 1025 provided in accordance with an exemplary embodiment of the present invention.

FIG. 10 provides a block diagram of the architecture of a wireless power transmission system 1000 including one amplifier 1025 provided in accordance with an exemplary embodiment of the present invention. As shown in FIG. 10, a data signal 1005 can be generated in accordance with a method of providing a power optimized waveform 300 and input into a mixer 1010. The data signal 1005 input into mixer 1010, in the exemplary embodiment of the wireless power transmission system 1000 shown in FIG. 10, can be multiplied by a power optimized waveform baseband signal 1035. In one embodiment, the data signal 1005 and the power optimized waveform baseband signal 1035 can be implemented in software, such as MATLAB, and the resulting multiplied signal can be connected to a Digital to Analog Converter ("DAC") to be converted to analog signal to be output. As shown in the exemplary embodiment of the wireless power transmission system 1000 in FIG. 10, the analog signal can be input into a second mixer 1015. The second mixer 1015 can also be connected to a local oscillator 1020 in the exemplary embodiment shown in FIG. 10. In an exemplary embodiment, the local oscillator 1020 can up-convert the analog signal around a desired center frequency, such as 915 MHz. The output of the local oscillator 1020 can be connected to an amplifier 1025 as shown in the exemplary embodiment of the wireless power transmission system 1000 in FIG. 10. The amplifier 1025 can amplify the power optimized waveform 400 by a certain gain value, such as 20 dB gain. The amplifier 1025 in an exemplary embodiment, can be connected to an antenna 1030 for transmission of the power optimized waveform 400 to one or more wirelessly powered devices 105.

Figure 11:
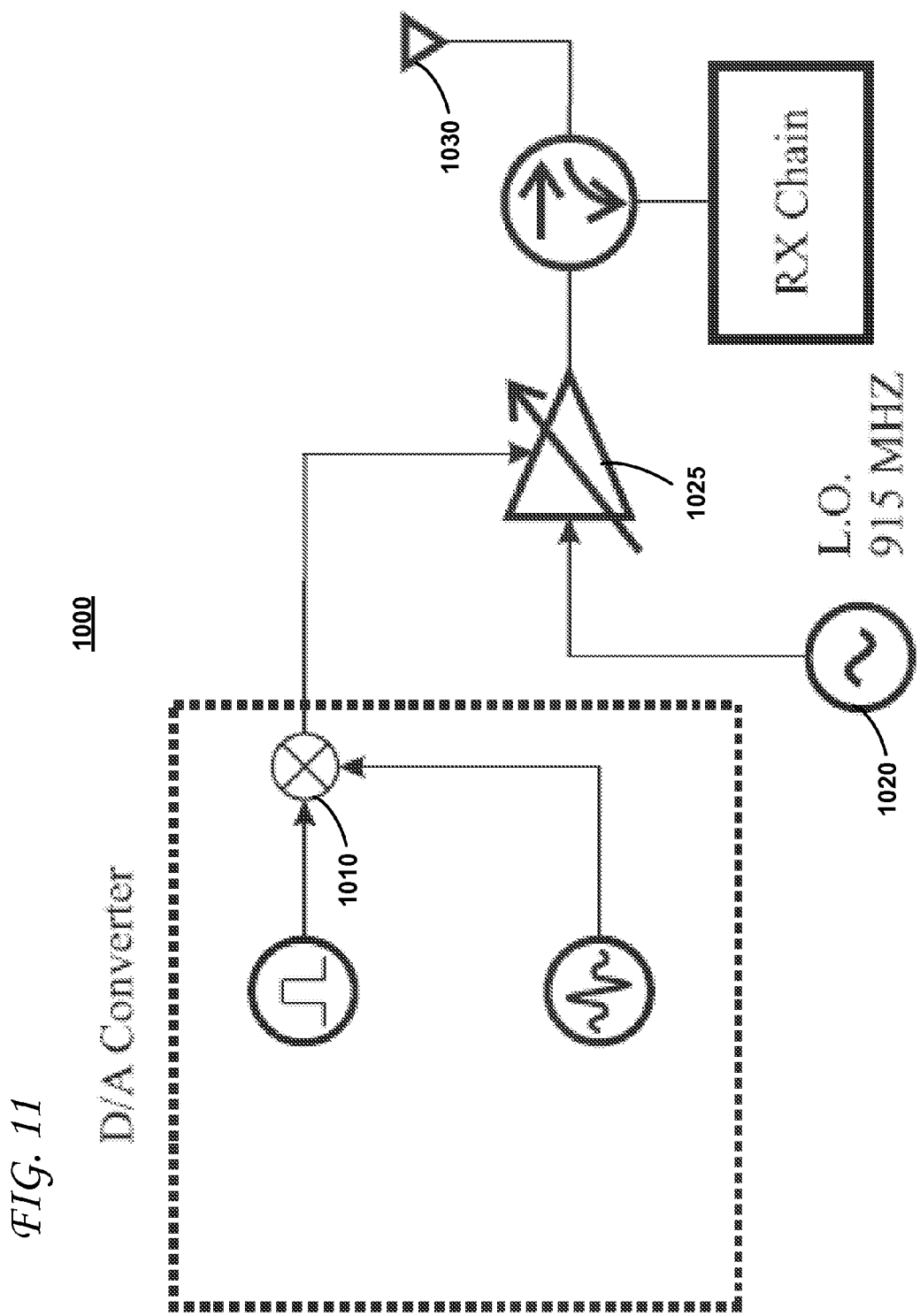
FIG. 11 provides a block diagram of the architecture of a wireless power transmission system 1000 including one amplifier 1025 provided in accordance with an exemplary embodiment of the present invention.

FIG. 11 provides a block diagram of the architecture of a wireless power transmission system 1000 including one amplifier 1025 provided in accordance with an exemplary embodiment of the present invention. The wireless power transmission system 1000 embodiment shown in FIG. 11 is similar to the embodiment shown in FIG. 10, except that the second mixer 1015 is eliminated by configuring the local oscillator 1020 with the amplifier 1025. As shown in the exemplary embodiment in FIG. 11, the local oscillator 1020 can be connected to the input of the amplifier 1025. Furthermore, the output of mixer 1010 can be connected to the bias power for the amplifier 1025.

Those of skill in the art will appreciate that the embodiments of the wireless power transmission system 1000 show in FIGS. 10 and 11 can often require a high class amplifier, such as a large Class A amplifier, depending upon the parameters of a given implementation. Large Class A amplifiers operate over the whole of the input cycle such that the output signal is ideally a scaled-up replica of the input with no clipping. These Class A amplifiers are often not very power efficient, and thus are not suitable for many implementations of wireless power transmission systems 1000.

Figure 12:
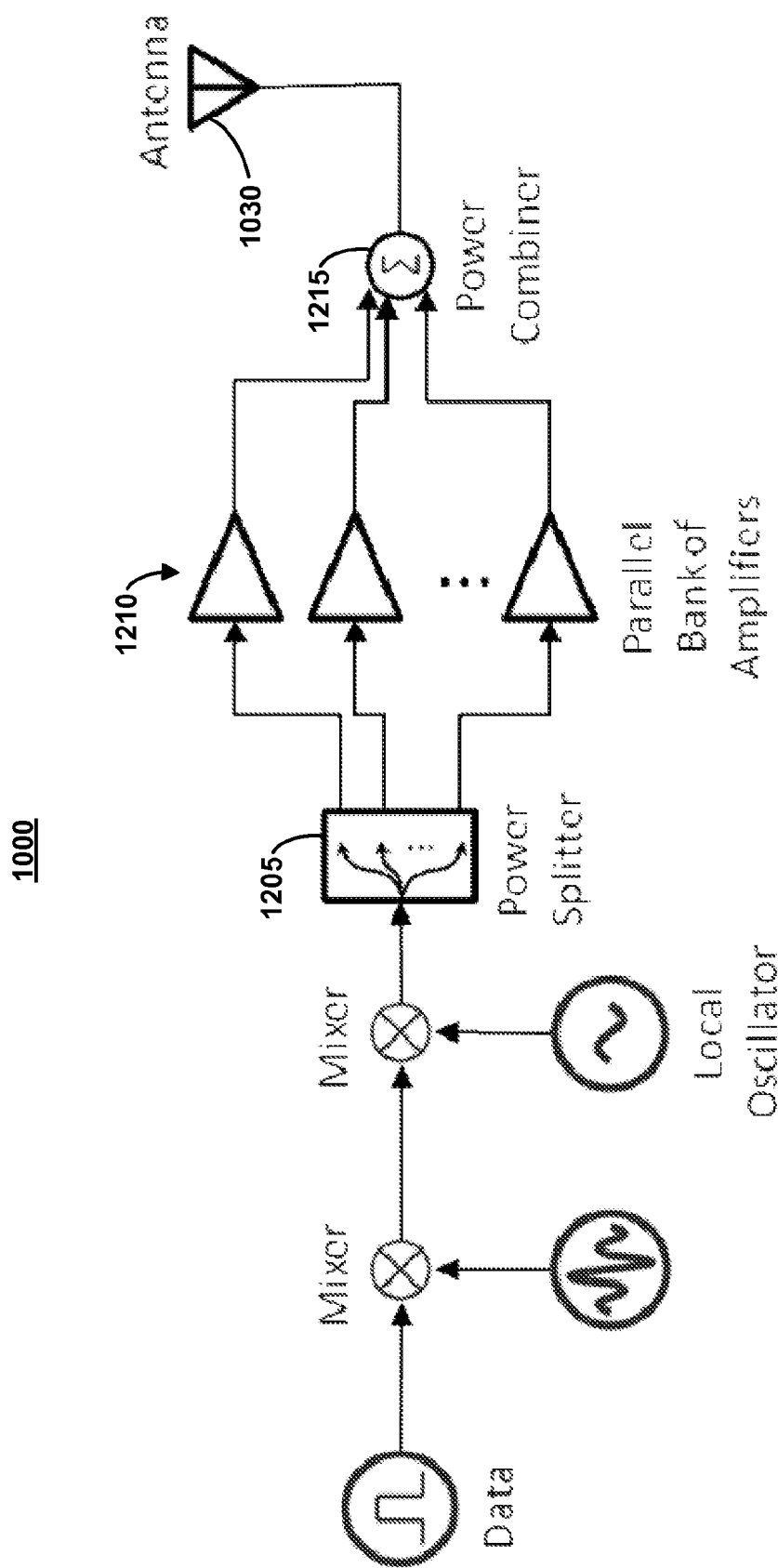
FIG. 12 provides a block diagram of the architecture of a wireless power transmission system 1000 including multiple amplifiers 1210 provided in accordance with an exemplary embodiment of the present invention.

FIG. 12 provides a block diagram of the architecture of a wireless power transmission system 1000 including multiple amplifiers 1210 provided in accordance with an exemplary embodiment of the present invention. Those of skill in the art will appreciate that the embodiments of the wireless power transmission system 1000 show in FIGS. 10 and 11 may result in distortion from the amplifier 1025 if the input signal drives the amplifier 1025 beyond its output capabilities. The embodiment of the wireless power transmission system 1000 shown in FIG. 12 provides a similar architectures to those in FIG. 10 and FIG. 11, except that it includes a power splitter 1205 to split the signal into multiple lower-powered signals. These multiple lower-powered signals can be connected to an array of two or more amplifiers 1210. Because these lower powered signals are less likely to saturate an amplifier, the array of two or more amplifiers 1210 can be made up of smaller amplifiers, such smaller class A amplifiers. After amplification by the array of two or more amplifiers 1210, the exemplary embodiment of the wireless power transmission system 1000 shown in FIG. 12 can input the multiple amplified signals into a power combiner 1215 for aggregation. Once the multiple amplified signals have been combined by the power combiner 1215, the resulting power optimized waveform 400 can be output by antenna 1030. Those of skill in the art will appreciate that the multiple amplifiers 1210 in the exemplary embodiment of the wireless power transmission system 1000 shown in FIG. 12 can help reduce the distortion introduced into the power optimized waveform 400 by the system 1000.

Figure 13:
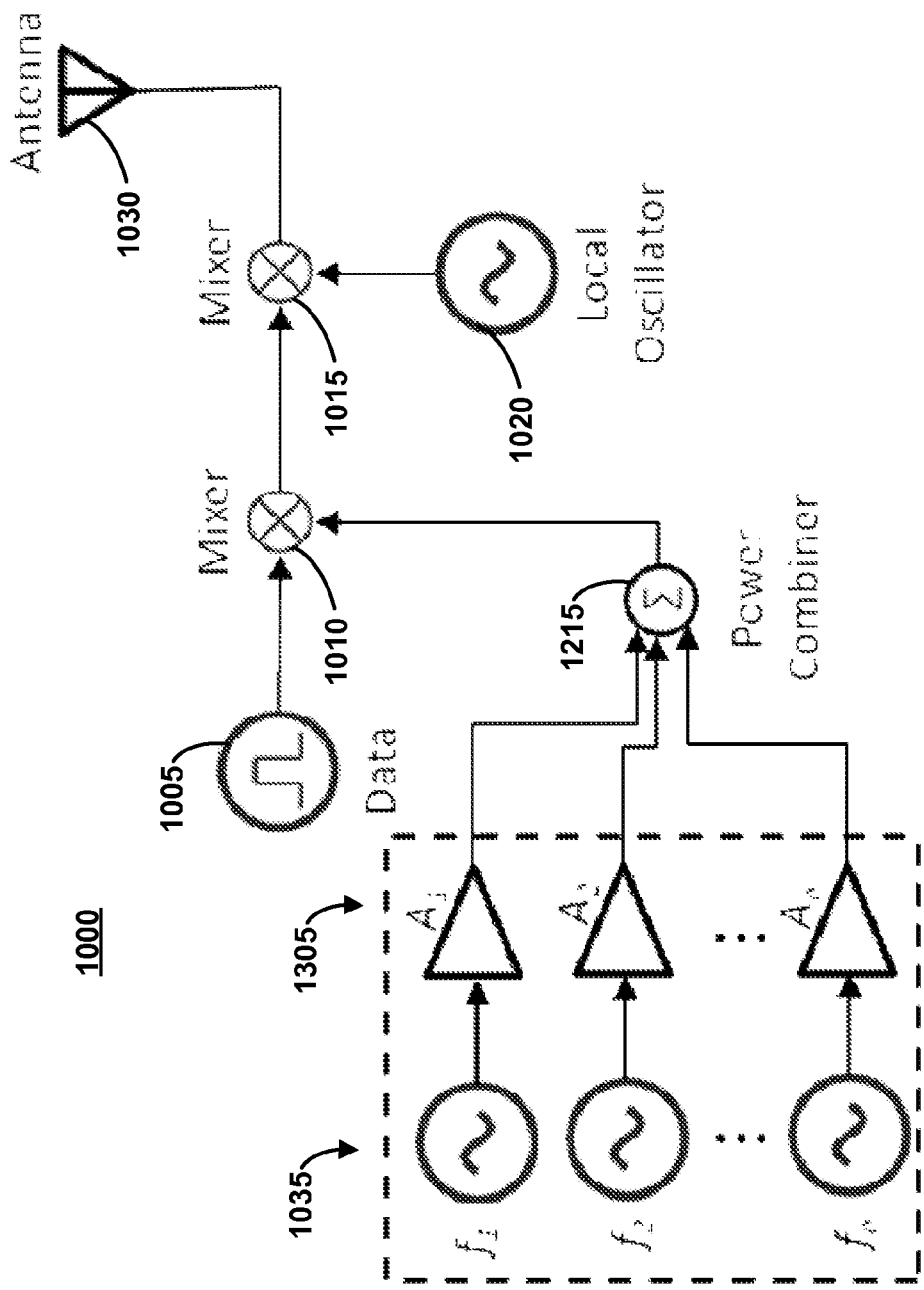
FIG. 13 provides a block diagram of the architecture of a wireless power transmission system 1000 including multiple subcarriers provided in accordance with an exemplary embodiment of the present invention.

FIG. 13 provides a block diagram of the architecture of a wireless power transmission system 1000 including multiple subcarriers provided in accordance with an exemplary embodiment of the present invention. The embodiments of the wireless power transmission system 1000 shown in FIGS. 10-12 involved mixing before amplification. The exemplary embodiment of the wireless power transmission system 1000 shown in FIG. 13 involves mixing after amplification. As shown in FIG. 13, the power optimized waveform baseband signal 1035 can be broken up into its separate frequency components, $f_1$ through $f_n$, and each frequency component can be amplified by an array of amplifiers according to the power optimized waveform spectrum design. In an exemplary embodiment, each power optimized waveform frequency, $f_i$, can have an associated power level, $A_i$, and the equation for the power optimized waveform can be expressed as the following:

$$x(t) = \sum_{i=1}^{n} \sqrt{A_i} \sin(2\pi f_i t) =$$
$$\sqrt{A_1} \sin(2\pi f_1 t) + \sqrt{A_2} \sin(2\pi f_2 t) + \ldots + \sqrt{A_n} \sin(2\pi f_n t)$$

In the exemplary embodiment of the wireless power transmission system 1000 shown in FIG. 13, the individual frequency components, $f_1$ through $f_n$, of the power optimized waveform baseband signal 1035 can be summed together in a power combiner 1215. Output of the power combiner 1215 can be input to mixer 1010 to be combined with the data signal 1005. The output of the first mixer 1010 can be input into the second mixer 1015 to be up-converted by the local oscillator 1020 in the exemplary embodiment shown in FIG. 13. The output of the second mixer 1015 in an exemplary embodiment can be the power optimized waveform 400 connected to the antenna 1030 for distribution. The exemplary embodiment of the wireless power transmission system 1000 shown in FIG. 13 can be configured with lower-class amplifiers in comparison to other embodiments, such as Class B or Class C amplifiers, due to the fact that the output distortion can be easily filtered out. Additionally, these lower-class amplifiers can work better with certain harmonic signals than some amplitude-modulated carriers.

Those of skill in the art will appreciate that the various embodiments of the wireless power transmission system 1000 described above can be modified according the demands and parameters of a given system, including the desired range and reliability of the wirelessly powered devices 105. For example, and not limitation, filters, control loops, and other system blocks could be added to the wireless power transmission system 1000 depending on the requirements for a particular implementation.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A method of powering wirelessly powered devices comprising:
   providing a wirelessly powered device and a wireless power transmission system;
   constructing, via the wireless power transmission system, a power optimized waveform, wherein the power waveform comprises:
      a summation of a plurality of subcarriers having distinct frequency components; and
      a plurality of cycles, wherein each cycle of the power optimized waveform includes a charge portion and a starve portion, and further wherein the maximum voltage of the charge portion is at least double the Root Mean Square ("RMS") voltage of the starve portion;
   transmitting, from the wireless power transmission system, the power optimized waveform; and
   receiving, at the wirelessly powered device, the power optimized waveform.

2. The method of claim 1, wherein a duration of the charge portion is less than 20% of a duration of the starve portion for each cycle of the power waveform.

3. The method of claim 1, wherein the maximum voltage of the charge portion is more than four times the RMS voltage of the starve portion.

4. The method of claim 1, wherein the power waveform is received by a charge pump of the wirelessly powered device.

5. A method of providing a power optimized waveform comprising:
   providing a charge portion of a first cycle of the power optimized waveform from a wireless power transmission system; and
   providing a starve portion of the first cycle of the power optimized waveform from the wireless power transmission system;
   wherein the maximum voltage of the charge portion is at least double the Root Mean Square ("RMS") voltage of the starve portion; and
   wherein the power optimized waveform has a derivative that is a continuous waveform.

6. The method of claim 5, wherein a duration of the charge portion is less than 20% of a duration of the starve portion for the first cycle.

7. The method of claim 5, wherein the maximum voltage of the charge portion is more than four times the RMS voltage of the starve portion.

8. The method of claim 5, wherein the power optimized waveform is received by a charge pump of a wirelessly powered device.

9. A method of providing a power optimized waveform comprising:
   aggregating a plurality of subcarriers having distinct frequency components;
   providing a charge portion of a first cycle of the power optimized waveform from a wireless power transmission system; and
   providing a starve portion of the first cycle of the power optimized waveform from the wireless power transmission system;
   wherein the maximum voltage of the charge portion is at least double the Root Mean Square ("RMS") voltage of the starve portion, and
   wherein the maximum voltage of the starve portion of the power optimized waveform is less than a threshold voltage of a diode of a charge pump of a wirelessly powered device to which the power optimized waveform is provided.

10. A wirelessly powered device comprising:
    a charge pump including a voltage doubler, wherein the charge pump is configured to receive a power optimized waveform comprising a summation of a plurality of subcarriers having distinct frequency components; and
    wherein each cycle of the power optimized waveform includes a charge portion and a starve portion, and the maximum voltage of the charge portion is at least double the Root Mean Square ("RMS") voltage of the starve portion.

11. The wirelessly powered device of claim 10, wherein the charge pump is configured to receive a continuous wave waveform.

12. The wirelessly powered device of claim 11, wherein a range of the device is at least 10% greater when the charge pump receives the power optimized waveform in comparison to the continuous wave waveform.

13. A wirelessly powered device comprising:
    a charge pump including a plurality of diodes; and
    the charge pump configured to receive a power optimized waveform comprising a summation of a plurality of subcarriers having distinct frequency components;
    wherein a minority of the pulses in each cycle of the power optimized waveform provide a voltage greater than a threshold voltage of each of the plurality of diodes.

14. A method of powering wirelessly powered devices comprising:
    providing a wireless power transmission system; and
    providing a power waveform comprising a summation of a plurality of subcarriers having distinct frequency components to a wirelessly powered device from the wireless power transmission system;
    wherein each cycle of the power waveform includes a charge portion and a starve portion, and wherein the maximum current of the charge portion is at least double the Root Mean Square ("RMS") current of the starve portion.

* * * * *